UNITED STATES PATENT OFFICE.

JULIUS BUEB, OF DESSAU, GERMANY.

METHOD OF PREVENTING FREEZING OF GAS-PIPES.

SPECIFICATION forming part of Letters Patent No. 559,992, dated May 12, 1896.

Application filed September 5, 1895. Serial No. 561,547. (No specimens.)

*To all whom it may concern:*

Be it known that I, JULIUS BUEB, a subject of the Grand Duke of Baden, residing at Dessau, Anhalt, Germany, have invented a new and useful Method of Preventing Gas-Conduits from Being Stopped by Deposits Caused by Frost, of which the following is a full and clear specification.

An extremely troublesome disturbance in gas-lighting, in particular in street-lighting, consists in the stopping of the conduits produced in very frosty weather by the freezing of certain deposits out of the gas, which assume the form of fine ice-needles, and which narrow or close the clear cross-section of the gas-pipes. One of the oldest means for converting these hoar-frost-like deposits formed in the interior of gas-pipes into a liquid condition consists in the use of ordinary spirit. By means of this substance conduits leading, say, to street-lamps, are thawed, the burners being for this purpose screwed off and spirit poured into the conduit, which in flowing downward dissolves the frozen material and leads it to the next water-pocket. This method of remedying freezing (but not preventing it) is tedious, expensive, is only of temporary efficacy, and requires much time. Efforts to find out an efficacious preservative against freezing have therefore been made long ago. Already, sixty years ago, attempts have been made in England, and in 1844 James Malam proposed (English Patent No. 10,326, 1844) to prevent the separation of condensates within the conduit-network by submitting the whole quantity of gas to be delivered to the action of frost, while still in the gasworks, in large and, if necessary, artificially-cooled condensing vessels, called by him "freezing-cylinders," exposed freely to the external temperature. This method, based on the supposition that water coming from the manufacture and contained in the gas in the form of vapor was the sole cause of the freezing of the conduits, is not applicable in practice, and has indeed never been used, though latterly it has been proposed anew, although if correctly carried out the final purpose—namely, to prevent freezing in the pipe-network—may be attained. The fundamental idea contained in this method—namely, to extract from the lighting-gas already in the gasworks the condensable constituents—is found again in different form in several methods, the authors of which also considered as the cause of the freezing the water contained in the gas and attempted to free the gas from water by using water-absorbing chemical agents. There have been proposed and used as drying means of such a kind spirits, (method of J. Malam,) chlorid of calcium, (method of Dabrowski,) sulfuric acid—the latter, for instance, in the German Letters Patent No. 77,530. All of these methods are of no practical utility, though in part, at least, they are quite appropriate for preventing freezing.

In carrying out practically on a large scale the method described in the specification of the German Letters Patent No. 77,530 it has been proved that the opinion that the water contained in the gas is alone the cause of the freezing up of the gas-conduits is wrong, as in a severe frost not only water but also benzol is crystallized on the cold walls of the pipes. As in the method of desiccating by freezing-cylinders, as well as in the drying of the gas by means of spirits, benzol is also separated unintentionally. Besides water these methods are no doubt appropriate for preventing the closing of the gas-pipes by freezing, but this is effected at the expense of the illuminating power of the gas, benzol being the main light-producer of the gas. The illuminating power, which for the most part is brought to the prescribed degree only by gasifying expensive additional coals or by carbureting with benzol or similar substances, is controlled by the authorities and the public so strictly that a method like that of Malam, where the gas, owing to the contact with liquid spirit in a large area, loses so much benzol (more than ten grams per cubic meter, as shown by experience) that the illuminating power decreased about thirty-eight per cent., is, in spite of its efficaciousness, industrially not applicable. On the other hand, the separation of water alone, as it is obtained in the process described in the German Letters Patent No. 77,530, or in the method using chlorid of calcium, is not sufficient to prevent the stopping of the gas-pipes by freezing in a strong frost. Thus all the methods hitherto proposed or tried having for their final purpose to prevent the closing of the gas-pipes by frost by separating from the gas while in the gas-works the condensable constituents, or drying processes, are either inefficacious, or, when they are efficacious, they are inapplicable, owing to the decrease of the illuminating power of the gas.

According to my present invention I propose to attain the intended purpose, not by withdrawing from the gas any component part, as heretofore attempted, but by adding a substance that shall have the effect of lowering the freezing-point of the condensable constituents to such an extent that they precipitate only in a liquid condition. As a suitable means for this purpose ordinary spirit has proved advantageous. It is added to the gas either at the place of the gas production, preferably behind the gas-holder, or at any other point of the pipe-network, and in order to avoid any decrease of the illuminating or heating value of the gas the spirit is added in the form of vapor. This is necessary because, although liquid spirit would be absorbed in part by the gas within the gas-conduit, yet, on the other hand, the liquid would absorb benzol from the gas. Moreover, by adding the spirit-vapor produced outside the gas-conduit the quantity of the introduced spirit-vapor can always be exactly regulated corresponding to the quantity of gas produced and to the external temperature, while, when liquid spirit is introduced into the gas-conduit, the gas passing through takes up a larger quantity of spirit-vapor, the lower is the quantity of gas delivered at the moment and the higher is the external temperature. It is necessary that the addition of the spirit-vapor is capable of regulation, as on the one hand there must always be so large a quantity of spirit in the gas that the intended effect is attained, and on the other hand only so much must be added as will remain in the gas in the form of vapor. An appropriate quantity is five grams of spirit-vapor per cubic meter of gas delivered. In the case of particularly severe frosts a little more may be used.

In practically carrying out the method a small evaporator of ordinary construction, heated by a steam-jacket or by small gas-burners, is used, into which the spirit enters from a reservoir arranged at a higher level through a regulating-valve in a fine jet, which is immediately evaporated. The hot spirit-vapor is introduced through a small tube into the main and absorbed by the gas. The illuminating and heating value of the gas is not prejudicially influenced by the small quantity of spirit-vapor. The desired effect of the added spirit-vapor only takes place in that portion of the gas supply which is exposed to the action of the frost. The other (ordinarily much larger) portion of the gas is burned without the spirit contained therein exercising any effect. This is a great advantage of the new method in comparison with the drying by means of spirit. In the latter method the whole quantity of gas to be delivered is submitted already in the gas-works to the action of the alcohol, absorbing not only the water, but benzol, and thereby reducing the illuminating power. This is entirely unnecessary, as it is always only a small portion of the gas that passes to such places of the conduit (in particular, street-lamps) which are exposed to frost. When applied according to my invention, on the contrary, the spirit enters into action only where the gas is acted upon by frost and at the place where such action takes place in separating from the gas, together with the water and benzol, and thus preventing the latter from congealing, and consequently the conduits from being stopped by freezing.

Having now particularly described and ascertained the nature of my said invention and in what manner the same is to be performed, I declare that what I claim is—

The herein-described method for preventing freezing of gas-pipes, without reducing the illuminating or heating power of the gas, consisting in introducing into the main, while the gas is flowing, exactly measured and regulable quantities of spirit-vapor, adapted to lower the freezing-point of the condensable constituents for preventing their deposition in solid form.

In testimony whereof I have signed my name to this specification in the presence of two subscribing witnesses.

JULIUS BUEB.

Witnesses:
RUDOLPH FRICKE,
OTTO DOEDERLEIN.